Inventor
A. A. Miller

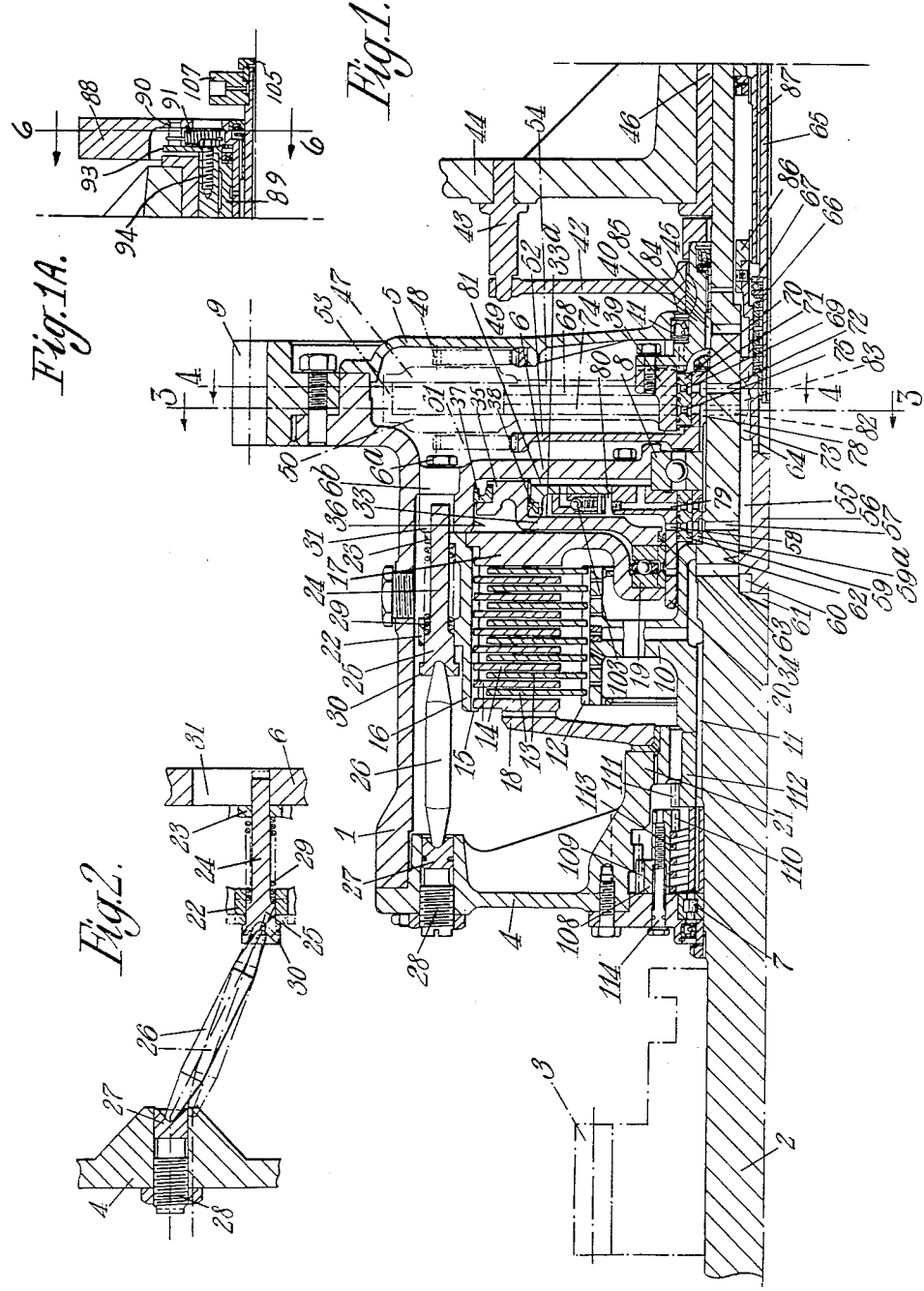

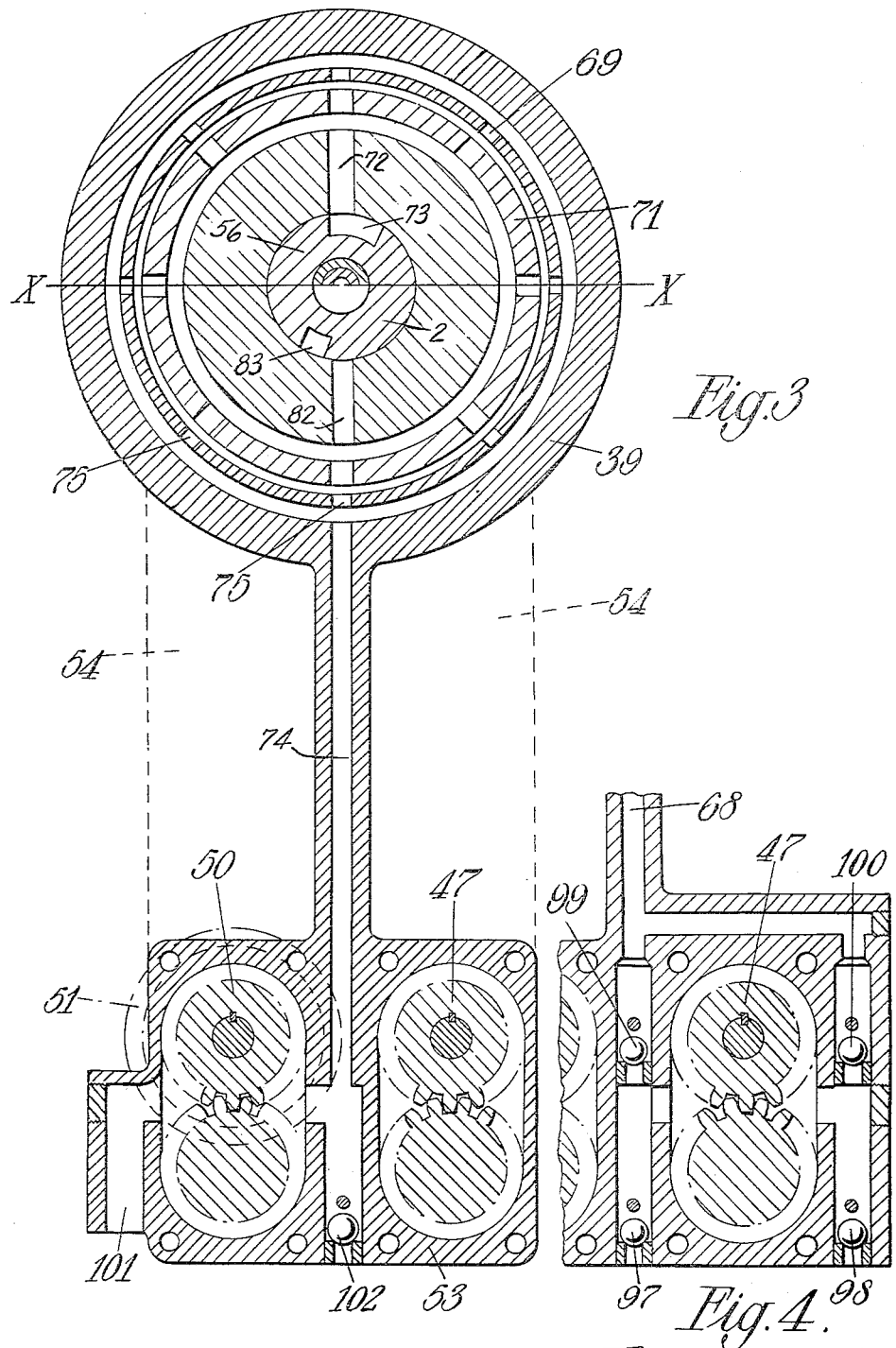

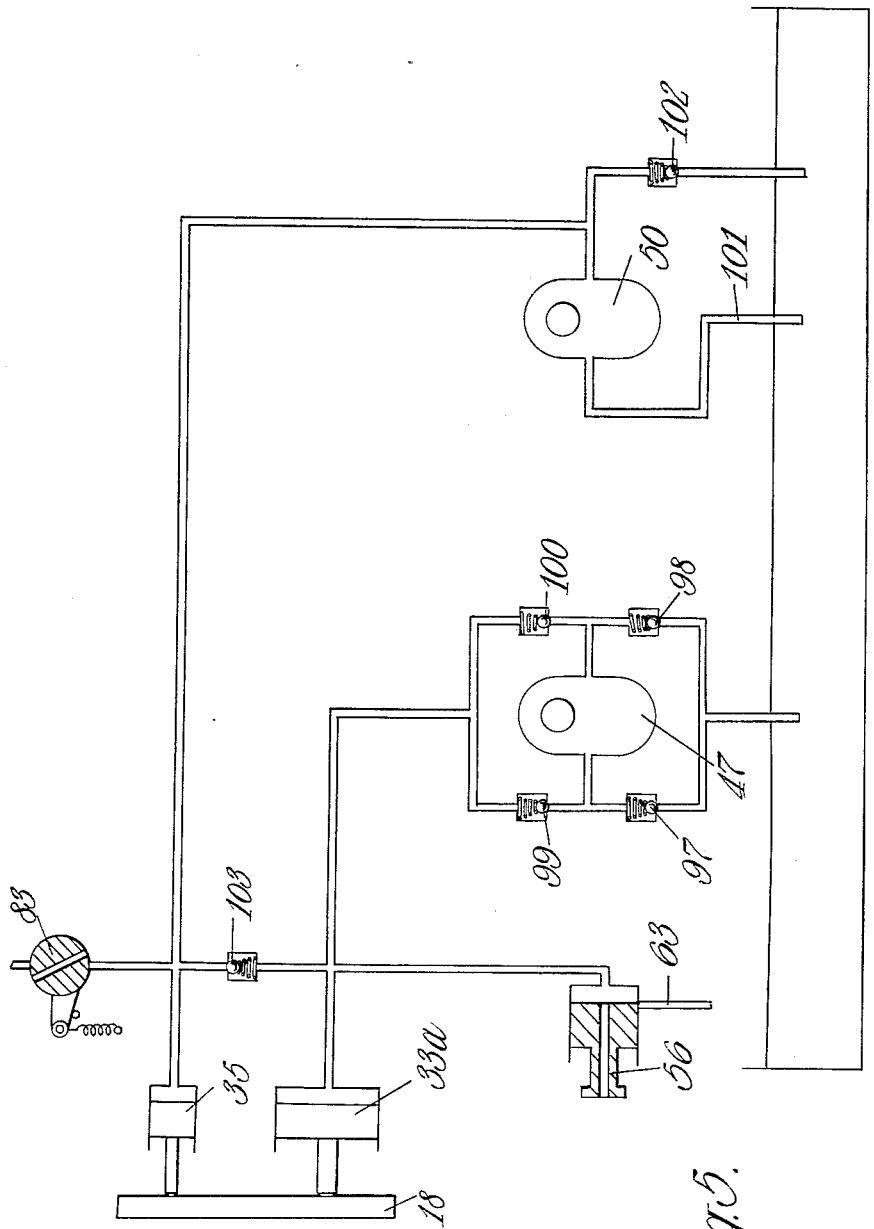

United States Patent Office 2,715,455
Patented Aug. 16, 1955

2,715,455

FRICTION CLUTCH RESPONSIVE TO REVERSAL OF DRIVEN MEMBER

Albert Arthur Miller, Coventry, England, assignor to Self-Changing Gear Company Limited, Coventry, England Application February 19, 1951, Serial No. 211,588

Claims priority, application Great Britain February 23, 1950

15 Claims. (Cl. 192—85)

The main object of this invention is to provide a construction of friction clutch in which the maximum torque capable of being transmitted by the clutch surfaces is automatically varied in accordance with the rotational speed of the output element of the clutch and also to provide that such torque is varied with the direction of rotation of the transmission. A further object is to provide a clutch having the above characteristic in which the engagement pressure of the clutch surfaces can be readily varied as desired and the corresponding maximum torque capable of being transmitted is indicated in a convenient manner.

The invention is intended more particularly, although not exclusively, for application to a clutch for controlling the drive of the power winch for the harpoon line in a whaling ship, where the main condition to be fulfilled is that the load on the line must at no time exceed the permissible maximum determined by the breaking strength of the line. Since it is frequently necessary to haul the line in and allow it to run out alternately, the above condition must be fulfilled for both forward and reverse motion of the controlling clutch, and since the mechanical efficiency of the sheave with which the line is engaged is relatively low, it follows that the maximum engagement pressure of the clutch surfaces must be reduced when the line is being pulled out. Furthermore, when hauling in the line under maximum load it frequently happens that the whale will suddenly start away and the line is liable to be broken unless the clutch engagement pressure is immediately relieved. It is accordingly a further object of the invention to provide a clutch construction capable of fulfilling the above requirements and more particularly the following:

1. The engagement pressure of the clutch surfaces is automatically varied in accordance with the direction of rotation of the line sheave, being reduced when the line is running out.
2. The engagement pressure of the clutch surfaces is automatically reduced if the line sheave should come to rest when hauling in the line.
3. The clutch engagement pressure is automatically reduced upon negative acceleration or slowing down of the line sheave when hauling in the line.
4. The clutch engagement pressure is readily and instantaneously variable over a wide range and is conveniently indicated to the winch driver.

The main feature of the invention is a friction clutch for the purpose described, in which application of the clutch is effected by power means, and means responsive to motion of the clutch output element is provided for modifying the action of said power means to vary the clutch engagement pressure. According to a further feature of the invention, separately operable power means are provided for applying the clutch, and one of said means is responsive to motion of the clutch output element.

In a preferred arrangement according to the invention, the power means or each of them referred to above are driven from the clutch, and in an arrangement comprising two power means, these may be driven respectively from the input and output elements of the clutch.

In a convenient arrangement according to the invention, the clutch is applied by hydraulic or oil piston means supplied from a pump or pumps driven from the clutch. Preferably, separate piston means or piston areas are operable in unison to engage the clutch, the arrangement being such that upon the output element of the clutch ceasing to rotate or reversing its direction of motion, the pressure of engagement of the clutch surfaces is reduced. In the application of the invention to the drive of a winch for a whaling harpoon line, this arrangement ensures that the clutch engagement pressure shall be less when the line sheave is stationary or running out than when hauling in. Also, when the clutch application is opposed by a force varying with the transmitted torque as previously described, the oil pressure can be taken as a measure of the maximum tension that will be exerted on the line, being determined by the torque transmitted by the clutch under all conditions, i. e. irrespective of the direction of rotation of the output shaft.

Manual control of the clutch may be provided by a valve which controls a leak-off or exhaust from the piston space. Oil is preferably employed as the hydraulic medium and the oil exhausted from the piston space is delivered to an enclosing casing for dispersing heat generated at the friction surfaces and for lubricating the interior parts of the clutch. Also the pump or pumps may be arranged within a part of the casing which serves as an oil sump. The pumps are preferably of the gear type.

According to a further feature of the invention, means is provided for varying the clutch engagement pressure in accordance with acceleration of the drive or of the output element of the clutch. In a preferred arrangement, such means comprises a displaceable and spring loaded inertia element such as a flywheel associated with the clutch and arranged to modify the action of the power means effecting clutch engagement. Such element may for example be mounted upon the output element or clutch output shaft and be arranged to actuate a valve controlling the pressure applied to the clutch actuating piston means to reduce said pressure and hence the clutch engagement pressure upon a slowing down or negative acceleration of the output element.

In the accompanying drawings:

Figure 1 is a longitudinal sectional elevation of the upper half of a clutch constructed in accordance with the invention;

Fig. 1A is a continuation of Fig. 1, showing the inertia member;

Figure 2 is a fragmentary plan view, showing one of the devices by which axial thrust is transmitted to the clutch applying member, the parts being shown in both rest and torque transmitting positions;

Figure 3 is a cross sectional view of one of the pumps, taken on the line 3—3 of Figure 1;

Figure 4 is a similar view of the second pump taken on the line 4—4 of Figure 1;

Figure 5 is a diagram showing the pump connections;

Figure 6:
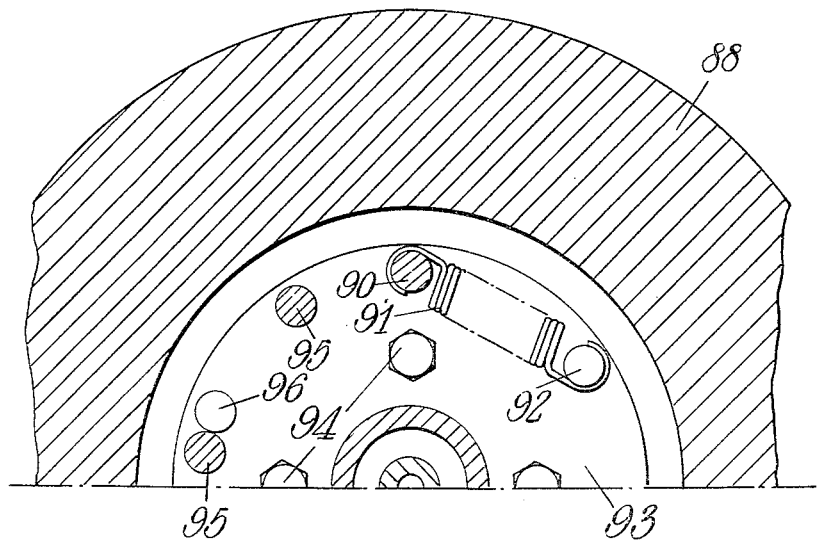
Figure 6 is a section taken on the line 6—6 of Figure 1.
Figure 7:
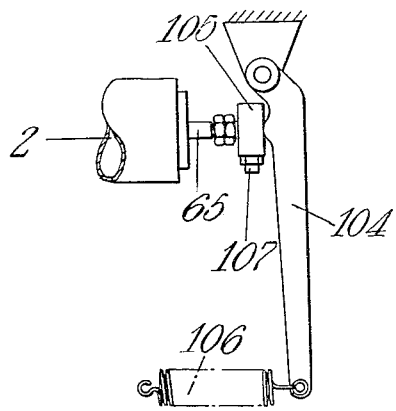
Figure 7 is an elevation of the actuating mechanism for the valve controlling operation of the clutch.

In carrying the invention into effect according to one convenient mode, as applied by way of example to a clutch for controlling the drive of a power winch for the harpoon line on a whaling ship, a multiple plate clutch assembly is arranged within an enclosing casing 1 rotatably supported upon an output shaft 2 to which the line sheave (not shown) is connected either directly or through a pinion indicated at 3. The casing comprises end walls 4 and 5 and an intermediate wall 6 attached by bolts 6a to an interrupted flange 6b, and is supported on bearings 7 and 8 carried by the shaft 2. A gear ring 9 secured to the rotatable casing 1 enables the drive from the winch engine to be applied thereto. A hub 10 is splined at 11 to the shaft 2 and has splines 12 engaged with an inner series of annular clutch plates 13, with which are interleaved the outer series of annular clutch plates 14, the latter being engaged with internal splines 15 on a drum 16. The drum 16 is carried upon pressure plates 17 and 18. The pressure plate 17 is rotatably supported on a journal and thrust bearing 19 carried by an inwardly directed annular flange 20 secured to the intermediate casing wall 6. The pressure plate 18 is rotatably supported upon an inwardly directed annular flange 21 formed on the end casing wall 4.

The drum 16 is formed with spaced annular flanges 22, 23 having a series of aligned holes therein for slideably receiving pins 24 having at one end bearing blocks 25, the pins being uniformly spaced round the drum and lying parallel to the axis thereof. The bearing blocks 25 are of socket form to receive the rounded ends of struts 26 the opposite ends of which are received in bearing blocks 27 adjustably secured in the end wall 4 of the casing by screws 28. The bearing blocks 25 and 27 for each strut 26 are angularly displaced so that the struts are inclined with respect to the drum axis as seen in Figure 2, and these struts are adapted to act as thrust members for transmitting rotation of the casing 1 to the drum 16. The pins 24 are loaded by springs 29 which bear against the rear flange 23 and upon a shoulder of the block 25, the latter having a flange 30 which, when the spring 29 is compressed, engages with the front flange 22 of the drum. Also the rear ends of the pins 24 project into recesses 31 formed by interruptions in a peripheral portion of the intermediate wall 6. By this arrangement, rotation of the drum 16 relative to the casing 1 is limited by the bounding walls of the spaces 31 so that such relative movement cannot release the struts from their bearing blocks. When the casing 1 is rotated in a direction corresponding to reeling in of the harpoon line, the struts 26 will tend to move from the rest position shown in full lines in Figure 2 to the thrust position shown in broken lines. This thrust acting on the drum 16 through the engaged flanges 30 and 22 referred to previously is taken by the pressure plate 17, the inner diameter of which is engaged, through a thrust bearing 19, by an annular hydraulic piston 33 located within the intermediate casing wall 6 and in sliding engagement through a sealing ring 34 with the flange 20 forming part of said wall 6. The piston 33 has a trunk portion 35 slidable within a correspondingly shaped recess 36 in the wall 6. An outer sealing ring 37 is provided between the outer periphery of trunk portion 35 and the inner surface of the outer wall of the recess and an inner sealing ring 38 on the inner wall of said recess engages the inner periphery of the trunk portion 35. Thus trunk portion 35 constitutes an auxiliary piston comprising the area lying between sealing rings 37 and 38, the main piston being constituted by the area thereof within the auxiliary piston indicated at 33a, comprising the area between the sealing rings 38 and 34.

The action of the series of inclined struts 26 which form an element of the drive is that when the clutch is transmitting torque the full axial force of the main and auxiliary pistons is not applied to the clutch plates since a proportion of such axial force is employed in maintaining the struts under compression. Thus referring to Figures 1 and 2, rotation of the casing 1 and end wall 4 causes the struts 26 to move towards their thrust position shown in broken lines in Figure 2 so that they are placed under end thrust in transmitting rotation to the clutch drum 16. The axial force thus exerted by the struts is transmitted through the pins 24 and springs 29 to the drum flange 23 and thence to the pressure plate 17. It follows that the axial force exerted by the main and auxiliary pistons on the pressure plate 17 is opposed by the opposing force exerted thereon by the struts 26 and hence the clutch plate engaging pressure will be less than the full axial pressure than can be applied by the main and auxiliary pistons. Thus there is provided a means for modifying the operation of the fluid pressure operable means, i. e. the main and auxiliary pistons, to reduce the clutch engagement pressure whilst maintaining a predetermined engaging pressure thereof.

The main and auxiliary pistons or piston areas are supplied with pressure oil from separate gear pumps mounted in the space between the intermediate casing wall 6 and the end casing wall 5. The pumps are carried upon a ring 39 secured to a sleeve 40 surrounding the shaft and extending outside the casing 1 through a seal 41. This sleeve is held stationary by an arm 42 anchored by means of a pin 43 to a part 44 of the winch frame, the arm 42 being connected to the sleeve 40 by a key 45. The winch frame part also carries one of the bearings 46 for the output shaft 2.

The pump 47 which supplies oil to the main piston area 33a, referred to hereinafter as the input pump, includes a pinion 48 driven from a gear ring 49 secured to the end wall 5 of the clutch casing. The pump 50 which supplies oil to the auxiliary piston area 35, and referred to hereinafter as the output pump, includes a pinion 51 driven from a gear 52 which is keyed to the output shaft 2. The two pumps are combined in a single casing 53 as shown which is attached to the ring 39 by webs 54 in which are included the delivery ducts of the two pumps. It is to be noted that in Figure 1, these pumps are shown for convenience as being located in the upper half of the clutch casing, but in practice they are arranged in the lower half as shown in Figure 3, this arrangement being desirable so that the casing can act as an oil sump from which the pumps can draw at all times. With regard to Figure 3, it is to be noted that in the upper half of the figure, the section below the line X—X is taken on the plane 3—3 of Figure 1, whereas the section above the said plane is taken on the plane 4—4.

The output shaft 2 is provided with a blind concentric bore 55 in which a piston valve 56 is axially slidable. A radial port 57 in the shaft affords communication between the bore 55 and the main piston space through a passage 58 in the flange 20, grooves and ports in the muff 59 and similar grooves and ports in the sleeve 59a secured to the shaft 2. The piston valve 56 has a groove 60 leading to the end space 61 of the bore 55 so that oil pressure applied to the main piston area 33a will tend to move the piston valve outwardly, i. e. to the right as viewed in Figure 1. A collar 62 on the piston valve controls radial ports 63 in the shaft communicating with the interior of the clutch casing, and oil thus entering the latter will lubricate the clutch parts and also afford a supply of oil for the pumps, suitable communicating openings in the various parts being provided for this purpose. The piston valve 56 has a central bore 64 within which is located a tubular strut 65 for actuating the valve by axial movement through an interposed spring 66 and thrust bearing 67. Oil is delivered by the input pump 47 through a duct 68 and thence through grooves and ports 69 in the stationary muff 70 and further grooves and ports in the sleeve 71 attached to the shaft to a radial port 72 in the shaft communicating with a wide groove 73 in the piston valve 56, whence it reaches the bore 55. The arrangement is such that when the piston valve is moved inwardly by its actuating strut 65, escape of oil to the clutch casing by way of the escape port 63 will be throttled or cut off by the valve collar 62, and the oil pressure created by the pump 47 in the main piston space will be proportional to the thrust applied to the said strut.

The output pump 50 delivers oil through a duct 74, grooves and ports 75 in the stationary muff 70 and thence through similar grooves and ports in the sleeve 71 to a space 78, passage 79, branch passage 80, and passage 81 to the cylinder space of the auxiliary piston 35. A radial port 82 in the shaft lies out of line with a groove 83 in the piston valve when the latter occupies its normal angular position as shown in Figure 3. The groove 83 leads to the right as viewed in Figure 1 to a radial exhaust port 84 in the shaft communicating with a space 85 and thence to the casing space in which the pumps are located. Thus by rotating the piston valve to bring the groove 83 opposite the port 82, the oil pressure acting upon the auxiliary piston will be relieved. An internally splined sleeve 86 secured to the piston valve engages with splines on a tubular member 87 forming part of an inertia or flywheel member 88 mounted for rotation at the end of the shaft 2 and supported upon a bearing 89 located in the shaft bore. Pins 90 on the flywheel member are connected by springs 91 to pins 92 on a plate 93 which is secured to the shaft 2 by bolts 94. Also stop pins 95, 96 are suitably secured to the flywheel member and plate 93 respectively to limit the possible angular motion of the flywheel member relative to the shaft. The arrangement is such that when the winch is operated to haul in the line and the shaft 2 is rotating at substantially constant speed, the flywheel member will occupy the position shown in Figure 6 and the radial exhaust port 82, Figure 3, will be closed. In the event of a sudden slowing down or negative acceleration of the shaft, inertia of the flywheel member will cause it to move relatively to the shaft against the force of the springs 91 and thereby rotate the tubular member and with it the piston valve 56 to open the exhaust port 82 and thus relieve the oil pressure acting on the auxiliary piston area, so that the engaging pressure of the clutch plates is substantially reduced.

The input pump 47 is arranged to operate in either direction of rotation and has two non-return inlet valves 97, 98 and two non-return delivery valves 99 and 100. Thus the pump will supply oil to the main piston space on rotation of the clutch in either direction. The output pump has a inlet 101 and a non-return relief valve 102 on the delivery side which prevents the creation of a negative pressure in the system when the pump is reversed. A spring-loaded valve 103 affords communication between the auxiliary and main piston spaces, so that when the main piston space is exhausted, as by withdrawing the piston valve to open the exhaust port 63, the pressure in the auxiliary piston space will also be discharged. The pump connections are shown in a simplified form in Figure 5.

Actuation of the piston valve 56 through the strut 65 is effected by a pivoted lever 104 bearing on the end cap 105 of the strut and connected by a spring 106 to a control lever (not shown) which is operable by the winch driver. The hollow strut is provided at its outer end with a connection 107 for a flexible pipe leading to a pressure gauge (not shown). Such gauge will give an indication of the force causing engagement of the clutch plates and may be graduated, if desired, to show the corresponding pull on the line.

Provision is made for directly coupling the clutch casing and output shaft if this is desired for emergency or other reason. A sleeve 108 is axially slidable in the end wall 4 of the casing 1 and has teeth 109 engaged with similar teeth on the said wall. Internal teeth 110 on the said sleeve can be engaged with similar teeth 111 on a sleeve 112 splined to the shaft when the sleeve 108 is moved axially under its loading spring 113. Bolts 114 hold the sleeve in disengaged position as shown in Figure 1, and by releasing these bolts the clutch casing and output shaft may be permanently coupled when required.

It will be understood that the winch sheave is driven from the pinion 3 on the output shaft and a suitable prime mover, usually a steam engine, is connected to drive the gear ring 9 of the clutch casing. The arrangement is such that when the clutch casing is rotated to haul in the line, both pumps are operated to deliver oil to the main and auxiliary piston spaces, and the oil pressure will be determined by the position of the piston valve 56 controlling the exhaust port 63 communicating with the main piston space. The clutch plates can thus be engaged at maximum pressure. It will be noted that if the oil pressure supplied to the main piston space is reduced, by manipulation of the piston valve, the pressure in the auxiliary piston space will likewise be reduced by the oil passing through the by-pass valve 103.

When the line is being payed out by reversal of the prime mover, the direction of rotation of the output shaft and clutch casing is reversed and the pumps will be driven in the opposite direction. Under these conditions the input pump 47 will operate to supply oil to the main piston space but the output pump 50 will be inoperative and thus the maximum pressure at which the clutch plates can be engaged is substantially reduced. When the line is being reeled out by the whale, following stalling of the output shaft as referred to hereinafter, it is to be assumed that the prime mover will still rotate forwardly, and under these conditions the direction of rotation of the output shaft is reversed, but the clutch casing is not reversed. Consequently only the output pump would be driven in the opposite direction, so that no pressure would be delivered to the auxiliary piston but the input pump would deliver oil to the main piston.

If during the hauling in of the line the winch sheave should be brought to rest by an increased pull on the line, the output pump will come to rest and pressure in the auxiliary piston space will consequently fall and engaging pressure of the clutch plates will be proportionately reduced. This action can be forestalled by the operation of the flywheel member 88. Upon the slowing down of the winch sheave, particularly if the negative acceleration is considerable, the flywheel member will be displaced relatively to the shaft by reason of its inertia to open the exhaust port 82 as previously described and thereby release the oil pressure in the auxiliary piston space, thereby reducing the clutch plate engagement pressure before the output shaft has actually come to rest and preventing an excessive pull on the line.

Engagement of the clutch plates is effected by the piston 33 through the pressure plate 17, the reaction being taken by the pressure plate 18. The arrangement is such, however, that when the clutch is substantially torque-loaded the greater part of the piston thrust is not transmitted to the clutch plates but is employed to balance the torque reaction thrust of the inclined struts 26 which transmit rotational motion of the casing to the clutch plate drum 16. In this way the effect of changes in the coefficient of friction of the clutch plate surfaces is largely eliminated or reduced. The spring loading of the pins 24 which receive the struts tends to effect relative rotation of the clutch drum 16 when oil pressure in the piston spaces is relieved but this movement is limited by engagement of the pin ends with the walls of the spaces 31, so that there is no possibility of the struts 26 leaving their bearing blocks. In the rest position of the parts, as shown in full lines in Figure 2, the clutch can be driven in line-unwinding direction if desired.

It will be understood that the oil pressure in the main and auxiliary piston spaces can readily be varied from zero up to the possible maximum by operation of the piston valve controlling the leakoff from the main piston space, this valve being actuated by a hand lever connected through spring 106 to the lever 104, and the oil pressure can be read off on a gauge. Since this oil pressure is substantially proportional to the transmitted torque for one or the other direction of rotation of the clutch irrespective of the relation of the clutch surfaces, its value is a reliable measure of the maximum load which can be imposed on the harpoon line, and the gauge can be calibrated to indicate line load if so desired. In this connection it will be appreciated that the proportion of the net force effecting engagement of the clutch surfaces depends upon the amount of torque being transmitted, but it will always be reduced to substantially the same fraction of the gross force from the piston when the transmitted torque is increased to the point at which clutch slip occurs. The variations in the clutch applying force exerted by the hydraulic piston due to changes in the motion of the output shaft of the clutch are automatic and are superimposed upon the variations which can be effected by manipulation of the manual control.

The invention can be applied to clutches for other purposes than that described above and is not restricted to the details of the above example. Thus the motion of the clutch output element may be caused to vary the clutch engagement pressure in various ways and the arrangement may be modified whereby either positive or negative accelerations either increase or decrease the clutch engagement pressure.

I claim:

1. In a slippable friction clutch arrangement, rotatably mounted input and output means, frictionally engageable elements carried by the respective input and output means and operable when engaged to couple the said means together, means for driving the input means in at least one direction, means operably coupled to the output element for rotational movement in opposite directions at variable speeds, fluid pressure actuated means cooperable with the frictionally engageable elements for effecting and maintaining torque transmitting engagement between the elements, a fluid pump means operably coupled to said input means for delivering fluid under pressure to said fluid pressure actuated means, a second fluid pump means operably coupled to said output means for delivering fluid under pressure to said fluid pressure actuated means responsive to rotation of said output means in said one direction of rotation only whereby rotation of said input and output means in said one direction drives both pump means in unison for producing and maintaining clutch engaging pressure and any deceleration, stopping and reversal of direction of rotation of said output means reduces clutch engaging pressure by varying the delivery of said second pump means including cessation of delivery thereby.

2. In a clutch as claimed in claim 1 and said fluid pressure actuated means comprising hydraulic cylinder and piston means, conduit means communicating between both pump means and the cylinder means behind the piston means for supplying fluid under pressure to said piston means to move the same to clutch engaging position responsive to rotation of the input and output means in said one direction.

3. In a clutch as claimed in claim 2, in which said piston means comprises a single piston including two portions constituting separate effective piston areas and said conduit means comprising a first conduit means providing communication between one of said pump means and the cylinder means behind one portion of the piston and a second conduit means providing communication between the other of said pump means and the cylinder behind the other portion of the piston.

4. In a clutch as claimed in claim 1, in which said input means is rotatable in opposite directions, said first pump means including means driven by the input means in both directions of rotation, conduit means providing communication between said first pump means and the fluid pressure actuated means for delivering fluid regardless of the direction of rotation of the input means, the second pump means including a component driven by the output means, conduit means providing communication between the second pump means and the fluid pressure actuated means and a flow controlling valve means in said last mentioned conduit means operative to permit flow of fluid under pressure from said second pump means to said fluid pressure actuated means only when the output means is rotating in said one direction.

5. In a clutch as claimed in claim 1, and said fluid pressure actuated means comprising hydraulic cylinder and piston means, conduit means providing communication between both said pump means and the cylinder means, exhaust conduit means communicating with said cylinder means and a manually operable valve for controlling said exhaust conduit means and operable to exhaust fluid therefrom whereby clutch engaging pressure can be varied from zero to maximum.

6. In a clutch as claimed in claim 1, and in which said clutch output means comprises a shaft, said shaft having an axial bore therein, the fluid pressure actuated means for effecting clutch engagement comprising hydraulic piston and cylinder means, conduit means providing communication between both said pump means and said cylinder means, exhaust passage means providing communication between said cylinder means and the bore in said shaft, manually operable valve means movably mounted in the bore of the shaft for controlling the exhaust passage means for manually varying clutch engagement pressure from zero to maximum and further conduit means providing communication between the first pump means and the bore of the shaft beyond the end of the piston valve means whereby manual movement of the valve means to effect closing of the exhaust passage means is resisted by fluid under pressure.

7. In a clutch as claimed in claim 1, further including a casing means enclosing the frictionally engageable elements, the fluid pressure actuating means and both said pump means and adapted to contain lubricating medium, said fluid pressure actuating means comprising piston and cylinder means within the casing, conduit means providing communication between both said pump means and said cylinder means for actuating the piston means, fluid exhaust passage means providing communication between said casing and the conduit means and a manually operable valve for controlling said exhaust passage means and operable to vary clutch engagement pressure and exhaust lubricating medium into the casing to disperse heat concentrations and lubricate the clutch components within the casing.

8. In a clutch as claimed in claim 1, in which exhaust passage means are arranged between the second pump means and the fluid pressure actuated means, a spring loaded flywheel member mounted for rotation on the clutch output means, a movable valve means normally closing said exhaust passage means and means operatively connecting said valve means to said flywheel member whereby deceleration of the output means effects relative movement between the flywheel member and the output means to move the valve means to open position to exhaust fluid under pressure to reduce clutch engaging pressure.

9. In a clutch as claimed in claim 1, in which conduit means provide communication between both said pump means and the fluid pressure actuated means, the clutch output means comprising a shaft having an axial bore therein, exhaust passage means communicating with the respective pump means and each passage means including at least one conduit in the shaft communicating with the bore, one of the conduits in the shaft being spaced axially and radially of the other, a piston valve means mounted in the bore for controlling the conduits therethrough, said valve means being axially and rotatably displaceable in the bore and including a flow controlling portion cooperating with the conduit communicating with the first pump means upon longitudinal movement of the valve means and another flow controlling portion cooperating with the conduit providing communication with the second pump means responsive to rotational movement of the valve means, a spring loaded flywheel member mounted for rotation on said shaft, means operatively connecting said flywheel member to said piston valve means to rotate the valve means to exhaust fluid under pressure from the second pump means responsive to decelleration of the shaft and manual control means for effecting axial displacement of the piston valve means to open the conduit communicating with the first pump means to exhaust fluid under pressure from said first pump means, the exhaust flow of fluid through the conduits in the bore reducing clutch engagement pressure.

10. In a clutch as claimed in claim 1, and further including means applying a force in opposition to the force applied by the fluid pressure actuated means in an amount varying with the magnitude of the transmitted torque whereby the effect of changes in the coefficient of friction of the frictionally engageable element is reduced.

11. In a clutch as claimed in claim 1, including a plurality of movable strut means disposed between the input means and one of the frictionally engageable elements carried thereby, said struts being disposed obliquely with relation to the axis of rotation of the input means and operative to transmit drive from the input means to the frictionally engageable elements carried thereby and to apply a thrust on said frictionally engageable element in opposition to the clutch engaging pressure applied by the fluid actuated means that is approximately proportional to the transmitted torque whereby the effect of changes in the coefficient of friction of the frictionally engageable members is reduced.

12. In a clutch as claimed in claim 11, and said fluid pressure actuating means comprising hydraulic cylinder and piston means, said piston means being operative to move said frictionally engageable elements to clutch engaging position responsive to fluid pressure delivered by both said pump means and spring means for moving the piston means away from the frictionally engageable elements when pressure applied to the piston means is relieved.

13. In a clutch as claimed in claim 1, a rotatable casing constituting the input means, said frictionally engageable elements comprising a plate clutch assembly including a drum carried by said casing, said plate clutch assembly including sets of axially arranged plates, means mounting one set on said drum, the other set being carried by the output means and interleaved with the first set, said drum being axially and angularly movable relative to said output means and said casing, said fluid pressure actuated means including a piston means operative to move said drum axially in one direction to engage said plates, said casing including a wall spaced from and perpendicular to said drum, bearing blocks carried by said wall and having bearing surfaces therein, bearing blocks carried by said drum having bearing surfaces therein directed toward the first mentioned bearing surfaces but displaced radially thereof, struts having rounded ends disposed in the respective bearing blocks against the bearing surfaces whereby said struts are disposed obliquely of the axis of the drum, said struts transmitting rotation from the casing to the drum and being operative to apply axial movement to the drum in opposition to the force applied by the piston means that constitutes a thrust approximately proportional to the torque transmitted by the clutch, pin means carried by the drum, means mounting the pins on the drum for axial sliding movement relative to the drum, the bearing blocks carried by the drum being embodied with the pin means, spring means loading the pin means, and means for limiting angular movement of the drum relative to the casing so that the struts are maintained in their bearing blocks when clutch applying force is relieved.

14. In a clutch as claimed in claim 13, in which the last mentioned means comprise circumferentially spaced abutment means carried by the casing, said pin means having free ends projecting into the spaces between adjacent abutment means and the spacing between adjacent abutment means permitting limited angular movement of the drum relative to the casing but limiting such movement to a degree such as to prevent displacement of the struts from their bearing blocks.

15. In a slippable friction clutch arrangement, an output means comprising a rotatably mounted shaft, a set of clutch plates splined thereto and axially movable therealong, a casing means rotatably mounted on the shaft and including spaced end walls, a drum within the casing and surrounding said plates, another set of clutch plates splined within the drum, interleaved with the plates on the shaft and axially movable on the drum, a rotatable pressure plate journalled on and within the casing means, means restraining the same against axial movement, said plate supporting one end of said drum and permitting axial movement of the drum relative to the pressure plate, another pressure plate rotatably mounted within and on the casing means, supporting the other end of the drum and axially movable relative to the first pressure plate, said casing means including wall portions defining cylinder means axially adjacent the second pressure plate, piston means within the cylinder means, means adapted to rotate said casing in at least one direction, means operably coupling said casing with said drum whereby rotation of the casing rotates the drum, means operative in response to rotation of said casing for delivering fluid under pressure to said piston means, means operative in response to rotation of said shaft in one direction only for delivering fluid under pressure to said piston means whereby rotation of said casing and shaft in said one direction effects delivery of fluid in unison from both said last mentioned means so that said piston means moves said axially movable pressure plate toward the other pressure plate to frictionally engage the clutch plates and transmit and maintain drive between the casing and the shaft, and the means for delivering fluid under pressure in response to rotation of said shaft being operative in response to cessation of rotation of or reversal of said shaft to curtail delivery of fluid under pressure to thereby reduce clutch engaging pressure.

References Cited in the file of this patent

UNITED STATES PATENTS

| | | |
|---|---|---|
| 1,608,778 | Dunwoodie | Nov. 30, 1926 |
| 2,094,971 | Surdy | Oct. 5, 1937 |
| 2,109,420 | Guernsey | Feb. 22, 1938 |
| 2,208,865 | Gette | July 23, 1940 |
| 2,226,801 | Black | Dec. 31, 1940 |
| 2,308,681 | Eason | Jan. 19, 1943 |
| 2,372,883 | Daub | Apr. 3, 1945 |
| 2,400,585 | Wolff | May 21, 1946 |
| 2,528,585 | Farkas et al. | Nov. 7, 1950 |
| 2,587,823 | De Pew | Mar. 4, 1952 |

FOREIGN PATENTS

| | | |
|---|---|---|
| 19,837 | Great Britain | Sept. 22, 1908 |
| 359,833 | Great Britain | Oct. 29, 1931 |